(12) United States Patent
Soled et al.

(10) Patent No.: US 8,536,085 B2
(45) Date of Patent: *Sep. 17, 2013

(54) PREPARATION OF HIGH ACTIVITY COBALT CATALYSTS, THE CATALYSTS AND THEIR USE

(75) Inventors: Stuart L. Soled, Pittstown, NJ (US); Joseph E. Baumgartner, Califon, NJ (US); Christine E. Kliewer, Clinton, NJ (US); El-Mekki El-Malki, Falls Church, VA (US); Patricia A. Bielenberg, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,709

(22) Filed: Oct. 24, 2011

(65) Prior Publication Data

US 2012/0083410 A1    Apr. 5, 2012

Related U.S. Application Data

(62) Division of application No. 12/460,714, filed on Jul. 23, 2009, now abandoned.

(60) Provisional application No. 61/135,959, filed on Jul. 25, 2008.

(51) Int. Cl.
*B01J 23/75* (2006.01)
*B01J 23/36* (2006.01)

(52) U.S. Cl.
USPC .......................... 502/325; 502/326; 502/350

(58) Field of Classification Search
USPC ........................................ 502/325, 326, 350
See application file for complete search history.

(56) References Cited

U.S. PATENT DOCUMENTS

| 4,568,663 | A | * | 2/1986 | Mauldin | 502/325 |
| 4,729,981 | A | * | 3/1988 | Kobylinski et al. | 502/259 |
| 4,801,573 | A | | 1/1989 | Eri et al. | |
| 4,857,559 | A | | 8/1989 | Eri et al. | |
| 5,348,982 | A | | 9/1994 | Herbolzheimer et al. | |
| 6,124,367 | A | | 9/2000 | Plecha et al. | |
| 8,148,292 | B2 | * | 4/2012 | Soled et al. | 502/325 |
| 2002/0010221 | A1 | * | 1/2002 | Ionkina et al. | 518/715 |

FOREIGN PATENT DOCUMENTS

| EP | 1450861 B1 | | 10/1991 |
| WO | 199847618 | | 10/1998 |
| WO | WO 2004/045767 | * | 6/2004 |
| WO | 2007071899 A1 | | 6/2007 |

OTHER PUBLICATIONS

Journal of Catalysis, 1992, 137 (1), pp. 212-224.
STUD, Surf Sci. and Catalysis, vol. 162, 2006, pp. 103-110.
Den Breejen, et al., "On the Origin of the Cobalt Particle Size Effects in Fischer-Tropsch Catalysis", Journal of American Chemical Society, (2009), 131 (20), pp. 7197-7203.
Das, "Fischer-Tropsch synthesis: characterization and catalytic properties of rhenium promoted cobalt alumina catalysts", Fuel (2003), 83 (7), ISSN: 0016-2361.

* cited by examiner

*Primary Examiner* — Elizabeth Wood
(74) *Attorney, Agent, or Firm* — David M. Weisberg; Estelle C. Bakun

(57) ABSTRACT

A method is provided for preparing a supported cobalt-containing catalyst having substantially homogeneously dispersed, small cobalt crystallites. The method comprises depositing cobalt nitrate on a support and then subjecting the support to a two-step decomposition protocol. In the first step, the support is heated in an oxygen-containing, substantially water-free atmosphere to about 160° C. to form an intermediate decomposition product. This intermediate product is then or hydrolyzed and reduced, or hydrolyzed, calcined and reduced.

11 Claims, 10 Drawing Sheets

PREPARATION OF HIGH ACTIVITY COBALT CATALYSTS, THE CATALYSTS AND THEIR USE

This application is a divisional of co-pending U.S. application Ser. No. 12/460,714, filed Jul. 23, 2009, which application claims the benefit of U.S. Provisional Application No. 61/135,959, filed Jul. 25, 2008.

FIELD OF THE INVENTION

The invention relates broadly to supported, cobalt-containing catalysts. More particularly, the invention relates to cobalt-containing catalysts of highly dispersed, small particle-size cobalt crystallites.

BACKGROUND OF THE INVENTION

Catalysts comprising cobalt on a support such as silica or alumina are known to be useful in hydrogenation reactions such as hydrogenating aldehydes and nitriles. They are also used in hydrocarbon synthesis via the Fischer-Tropsch process.

In the case of the Fischer-Tropsch hydrocarbon synthesis process, especially when conducted in a slurry bubble column reactor, one preferred catalyst comprises cobalt supported on a titania support. Generally, the titania in such catalysts is in its rutile form.

Promoter metals, such as rhenium, zirconium, manganese and Group VIII noble metals are commonly used with cobalt catalysts to improve various aspects of catalytic performance. For example, the presence of Re or a Group VIII metal has a beneficial effect on the dispersion of Co crystallites.

The activity of a cobalt-containing Fischer-Tropsch catalyst has been shown to be proportional to the surface cobalt sites for cobalt particle sizes above 6 nm. See *Journal of Catalysis*, 1992, 137(1), 212-224. It also has been shown that metal crystallites that have a poor nanoscale homogeneity tend to agglomerate to a more severe degree than those with homogeneous nanoscale distribution. See *Stud. Surf Sci. and Catalysis*, Vol. 162, 2006, pg 103-110. Purportedly, the optimum cobalt crystallite size for Fischer-Tropsch catalysis is in the range of 6 nm since this provides a larger number of surface cobalt sites than larger crystallites and since crystallites below 6 nm have lower site activity than those of 6 nm and larger. See den Breejen, et al., "On the Origin of the Cobalt Particle Size Effects in Fischer-Tropsch Catalysis", *Journal of American Chemical Society*, (2009), 131(20), 7197-7203).

Thus, one object of the present invention is to prepare cobalt-containing catalysts that have an appropriate cobalt crystallite size and good nanoscale homogeneity.

Patent Publication WO 2007/071899 A1 discloses that exposing a silica-supported cobalt nitrate to a gas mixture containing NO and less than 5 vol % $O_2$ in He at the nitrate decomposition temperature and then followed by reduction results in the formation of very small metal particles.

Another object of the present invention is to provide a method for forming a cobalt catalyst having small cobalt crystallite size with good nanoscale distribution without the use of NO and He (or NO with any inert or oxidizing gas).

In U.S. Pat. No. 4,568,663, there is disclosed a Fischer-Tropsch hydrocarbon synthesis process which utilizes a catalyst comprising cobalt, rhenium and titania. This catalyst is made by impregnating a titania support with an aqueous solution of cobalt nitrate and perrhenic acid by the conventional incipient wetness method, drying and then calcining to decompose the cobalt nitrate to the oxide. The presence of rhenium serves several important functions: one is to aid in the dispersion of the cobalt; another is to aid in the reduction of the cobalt oxide when the catalyst is activated (reduced). High dispersion and full reduction of the cobalt results in a highly active catalyst. This result, however, does not come without cost because rhenium is a relatively expensive commodity.

Thus, there exists a need for means to better disperse the cobalt with a lesser amount of rhenium. Indeed, an object of the present invention is to provide a method for preparing a catalyst having highly-dispersed, small particle-size cobalt, with a homogeneous nanoscale cobalt distribution and which contains 0.2 wt % or less of rhenium.

SUMMARY OF THE INVENTION

In a first aspect, the present invention comprises a method for preparing a supported cobalt catalyst, preferably a titania- or silica-supported cobalt catalyst, having highly dispersed, small particle size cobalt, with a homogeneous nanoscale cobalt distribution.

In a second aspect, the invention comprises a method for preparing a metal or metal oxide promoted, supported cobalt-containing catalyst having highly-dispersed, small particle size cobalt, with a homogeneous nanoscale cobalt distribution.

In a third aspect, the invention comprises a method for preparing a supported cobalt-containing catalyst having substantially homogeneously dispersed, small cobalt crystallites and from about 0.01 wt % to 0.2 wt % Re, based on the total weight of the catalyst.

Other aspects of the invention will become apparent from the detailed description that follows.

In each of the various aspects of the invention, the catalyst is prepared by depositing cobalt nitrate on a catalyst support. Optionally, a promoter metal solution also may be deposited on the support. If used, the promoter metal may be co-deposited with the cobalt nitrate or subsequent to the deposition of the cobalt nitrate. Preferably, the so treated support is first dried and thereafter subjected to a two-step decomposition protocol. In the first step, the dried support is heated in an oxygen-containing, substantially water-free atmosphere to about 160° C. to partially decompose the cobalt nitrate, thereby forming an intermediate decomposition product. Thereafter, the intermediate product is hydrolyzed, and then reduced. Optionally the catalyst may be calcined in air between such hydrolysis and reduction.

Catalysts prepared by the foregoing method have highly dispersed cobalt with a surface-volume-averaged diameter (Dsv) of about 11 nm and less.

Thus, another aspect of the invention is the use of the catalyst in the Fischer-Tropsch hydrocarbon synthesis process.

DETAILED DESCRIPTION OF THE INVENTION

Catalyst supports useful in the method of the present invention include titania, silica, chromia, alumina, magnesia, silica-alumina, zirconia and the like. Typically, the support will be titania or silica. For use of this catalyst in the Fischer-Tropsch hydrocarbon synthesis process, it is preferred that the support comprise primarily titania where greater than 50 wt % of the titania is in the rutile phase. A particularly preferred support is disclosed in U.S. Pat. No. 6,124,367, which is incorporated by reference herein in its entirety. That support comprises primarily titania, converted from its anatase form to its rutile form, and a minor amount of a binder comprising alumina and/or silica.

Typically, the titania support used will have a surface area in the range of about 5 $m^2/g$ to about 40 $m^2/g$ and preferably from 10 $m^2/g$ to 30 $m^2/g$. Pore volumes will range from about 0.2 cc/g to about 0.5 cc/g and preferably from 0.3 cc/g to 0.4 cc/g. Typically the silica support used will have a surface area below about 100 $m^2/g$.

The cobalt is loaded on the catalyst support using techniques well known in the art, such as, impregnation of the support with a solution of cobalt nitrate either by spray drying or by the incipient wetness technique. Typically, the concentration and amount of the cobalt solution will be sufficient to provide a cobalt loading in the finished catalyst in the range of about 6 wt % to about 20 wt % and preferably about 8 wt % to about 12 wt % based on the total weight of the catalyst.

In an alternate embodiment of the invention, the support is also treated with a Group IV, VII or VIII promoter metal, and mixtures thereof in an amount sufficient to provide a loading of the promoter metal or mixture of metals in the range of about 0.01 wt % to about 5 wt % based on the total weight of the catalyst composition. In this embodiment, the support may be impregnated with a promoter metal solution subsequent to the impregnation with cobalt nitrate solution, or the support may be co-impregnated with cobalt nitrate and promoter metal solution.

In a preferred embodiment of the invention, the promoter metal is rhenium and the support preferably is treated with sufficient perrhenic acid to provide a loading of rhenium on the catalyst in the range of about 0.01 wt % to about 0.2 wt % based on the total weight of the catalyst.

After depositing the cobalt nitrate and optionally a promoter metal or metals solution, the so treated support is dried by any convenient means, such as, heating the supported catalyst in a rotary calciner to temperatures up to about 120° C. for a time sufficient to dry the treated support, conveniently for a period of from 30 minutes to one or several hours.

Importantly, the dried cobalt nitrate-containing support is subjected to a two-step decomposition protocol. In the first step, the dried cobalt nitrate-containing support is heated to a temperature sufficient for the catalyst to pass through the first endotherm of the nitrate decomposition as measured by thermal gravimetric/differential thermal analysis (TG/DTA) but not the second endotherm and to form a nitrosyl species with peaks in the range of 1820-1877 $cm^{-1}$ as evidenced by an infrared scan. Typically, the cobalt nitrate-containing support will be heated to 160° C.±5° C. in an $O_2$-containing atmosphere that is substantially free of $H_2O$ and is free of added NO. One skilled in the art can readily determine when the cobalt nitrate-containing support has passed through the first endotherm as readily seen in FIG. 1. For example, the atmosphere preferably will contain less than about 1% $H_2O$ and more preferably about 0% $H_2O$. A particularly preferred atmosphere is dry air. Following the first decomposition, the cobalt nitrate-containing support is referred to as an intermediate material. Further evidence of the formation of the intermediate material following the first decomposition is provided by the appearance of infrared peaks in the range of 1820-1877 $cm^{-1}$ which are an indication of the formation of nitrosyl species. Hence, the intermediate material is a nitrosyl species evidenced by peaks in the range of 1820-1877 $cm^{-1}$ in an infrared scan. The nitrosyl species is only present following the first decomposition, not before it, and not after the calcination.

The significance of the two-step protocol, with the first being conducted in a substantially dry atmosphere, is illustrated by reference to FIGS. 1 to 3.

Figure 1:
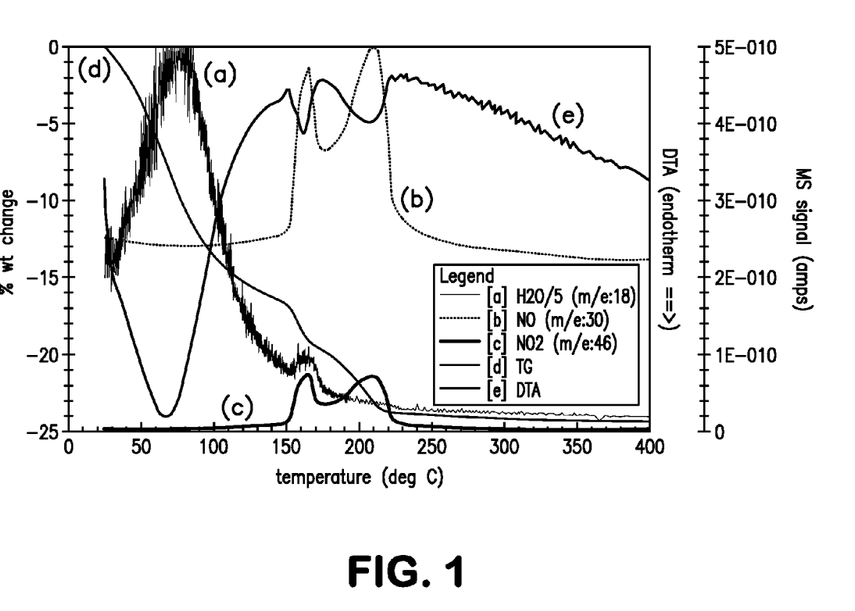
FIG. 1 is a TG/DTA spectra of a cobalt nitrate-perrhenic acid impregnated titania support that was heated in air from room temperature to 400° C. at 1° C./min.

First, FIG. 1 is a thermal gravimetric/differential thermal analysis (TG/DTA) spectra of a dried cobalt nitrate-perrhenic acid impregnated titania support that was heated in air at 1° C./min. from room temperature to 400° C. It is clearly seen that the nitrate decomposition follows a discrete two-step pattern with two endothermic events characterizing the process. Thus, FIG. 1 shows water loss from the support at temperatures below about 121° C. followed by the evolution of $NO_x$ and $H_2O$ at about 160° C. followed by only $NO_x$ being evolved at about 210° C.

Figure 2:
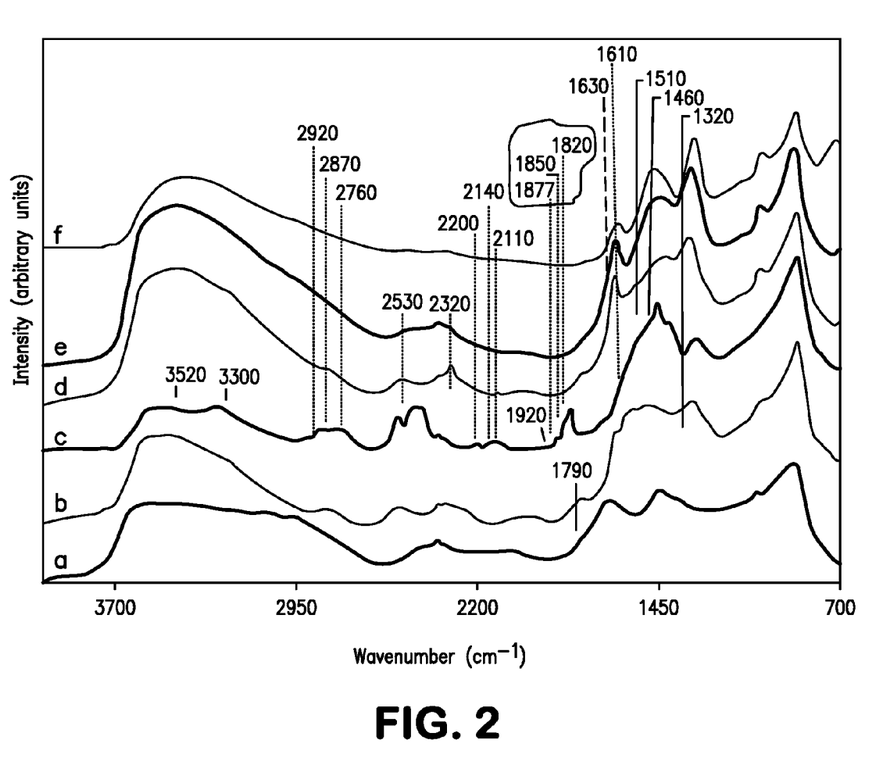
FIG. 2 is a DRIFTS spectra of a cobalt nitrate-perrhenic acid impregnated titania support that was subjected to various treatments.

FIG. 2 is a diffuse reflectance infrared Fourier transform spectroscopy (DRIFTS) spectra for: (a) the fresh Co—Re impregnated titania-support catalyst, (b) after drying in 10% $O_2$/He at 121° C. for 60 mins., (c) after calcining in 10% $O_2$/He at 160° C. for 60 mins., (d, e) after exposure to 10% $H_2O$ in He for 5 mins. and 15 mins. at 160° C., and (f) after purge with He for 60 mins. This spectra shows peaks developing at 1820-1877 $cm^{-1}$ (circled in the figure) which are indications of the formation of nitrosyl species after the first decomposition step. This species appears to disperse readily on the support and is hydrolytically unstable. Hence, the need to form this intermediate species in a dry environment.

Figure 3:
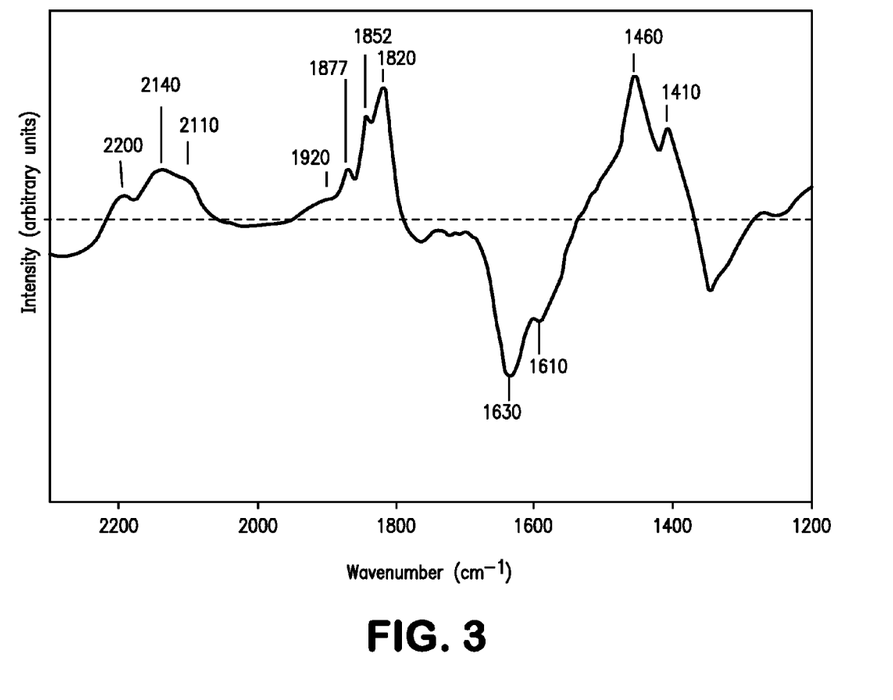
FIG. 3 is a difference DRIFTS spectra obtained by subtracting spectrum (b) of FIG. 2 from spectrum (c) of FIG. 2.

FIG. 3 is a DRIFTS spectrum obtained by subtracting the spectrum (b) of FIG. 2 from the spectrum (c) of FIG. 2. Basically, FIG. 3 illustrates that the dry atmosphere for the first decomposition in the two-step treatment protocol results in the formation of hydrolytically unstable but important nitrosyl species.

Returning to the treatment protocol of the method of the invention, it is desirable to maintain the heated cobalt nitrate-containing support at the temperature which forms the first endotherm (160° C.±5° C.) for a time sufficient for the intermediate to form and disperse on the support. The heating time will depend to some extent upon the type of heating system employed. For example, if the heating is conducted in a regular box furnace, heating times may be an hour or more. On the other hand, if heating is conducted in a rotary calciner, heating times may be much shorter. Thus, in the case of a rotary calciner the heated cobalt nitrate-containing support may be maintained at about 160° C. for a period of time which may be less than one minute but preferably for at least one minute and more preferably will be from about 2 mins. to about 10 mins.

After the first decomposition step, the intermediate formed is subject to a second decomposition step in which the intermediate product is hydrolytically decomposed. This second decomposition step is then followed by reduction. Optionally, calcination in air may be practiced before reduction.

Calcination is typically conducted in an oxygen-containing atmosphere, such as flowing air, at temperatures sufficient to pass through the second endotherm of the nitrate decomposition as measured by TG/DTA and form cobalt oxide. Typical temperatures for such calcination are above about 160° C., such as between about 300° C. to about 450° C., for about 1 to about 2 hours.

Reduction typically will be conducted in a flowing $H_2$ atmosphere at temperatures in the range of about 250° C. to about 450° C. for about 1 to 2 hours.

The intermediate typically is hydrolytically decomposed by exposing the intermediate to a humid atmosphere, such as moist air, for a time and at a temperature sufficient for the intermediate to decompose. For example, temperatures may range from a room temperature up to about 160° C. for times ranging from about 5 mins. to 12 hours. Thereafter, the product of the hydrolytic decomposition is subject to reduction under conditions such as those described above.

In a preferred aspect, the process of the invention is particularly preferred in instances where the impregnated support is treated with perrhenic acid in an amount sufficient to provide from 0 wt % to 0.2 wt % Re in the resultant catalyst.

The catalysts prepared by the method of the invention are characterized as having small cobalt particles that are homogeneously distributed on the support surface. Indeed, the surface volume particle size distribution, Dsv, of these catalysts typically is 10 nm or less, i.e., down to about 6 nm.

A cobalt-rhenium, titania supported catalyst prepared according to the invention is particularly suitable for use in hydrocarbon synthesis via the Fischer-Tropsch synthesis process, for as is known in the art, high dispersion and full reduction of the cobalt results in a more active catalyst. Importantly, a catalyst of the invention achieves high dispersion and full reduction of the cobalt and significantly lower rhenium content.

Thus, one embodiment of the invention comprises use of the catalyst prepared as disclosed and claimed herein in the Fischer-Tropsch synthesis process. As is described in the available literature, the Fischer-Tropsch process is conducted at temperatures in the range of about 175° C. to about 400° C. at pressures of from about 1 to 100 bar. The $H_2$/CO ratios range from 0.5/1 to about 4/1. Preferably, the catalyst made according to the invention is used in the process in a slurry bubble column reactor with gas hourly space velocities ranging from about 1,000 to 25,000. A preferred slurry bubble column operation is described in U.S. Pat. No. 5,348,982, incorporated herein by reference.

Experimental Measurements

A. Dsv Analysis

The Dsv (surface-volume-averaged diameter) data for the catalysts described herein were obtained by collecting about 20 to 80 random images of a given catalyst with a Philips CM 12 or Philips CM 200 transmission electron microscope operated at 120 kV and 200 kV, and at screen magnifications of 53,000× and 54,000× respectively. In all cases, the data were collected as digital images with a Gatan CCD camera system using Gatan's Digital Micrograph program, v. 2.5. The line drawing tool in the Digital Micrograph program was used to mark the diameter of each imaged metal particle from which a statistically determined Dsv is obtained. To calculate the Dsv, a histogram of the distribution of particle sizes is obtained from the TEM (transmission electron microscope) measurements, and from the histogram the Dsv is obtained by the following equation:

$$Dsv = \{sum(N_i D_i^3)\}/\{sum(N_i D_i^2)\}$$

where $N_i$ is the number of particles with a diameter $D_i$

B. TG/DTA/MS Analysis

TG/DTA data were collected on a Mettler TA 850 thermal analyzer to which a Balzers mass spectrometer was connected to monitor effluent gases. Samples of the catalysts were heated in flowing air at rates of 1° C./min.

C. FTIR Measurements

DRIFTS (Diffuse Reflectance Infrared Fourier Transform Spectroscopy) measurements were obtained on a Nicolet 670 FTIR spectrometer equipped with a liquid nitrogen cooled MCT detector.

EXAMPLES

In the Examples and Comparative Examples which follow, a number of cobalt-rhenium catalysts were prepared. All of the catalysts prepared were made using an identical titania support. In all instances, a cobalt nitrate and perrhenic acid solution was sprayed onto the support in a rotary tumbler to ensure a well-mixed, free-flowing impregnate. Thereafter, the impregnated supports were subjected to different thermal treatments, and the resultant catalysts were subjected to transmission electron microscopic (TEM) characterization and Dsv measurements.

1. Preparation of Titania Support (a) The Titania Support

A titania support was prepared by spray-drying as follows. A slurry feed was prepared by mixing 34.4 parts (by weight) of Degussa P-25 fumed $TiO_2$, 8.8 parts alumina chlorhydrol sol (containing 23.5 wt % $Al_2O_3$), 0.6 parts silica sol (Nyacol 2034 DI, containing 35 wt % $SiO_2$), and 56.2 parts water. This mixture was fed to a 9-foot diameter spray-drier at a rate of about 13 lb./minute through a 9-inch wheel atomizer spinning at 10,000 rpm. The spray-drying chamber was operated with an inlet air temperature of about 285° C. and an outlet temperature of about 120° C. while spraying. The product consisted of solid spherical particles with an average size of about 60 microns and a composition of 94% $TiO_2$, 5.4% $Al_2O_3$, 0.6% $SiO_2$ by weight.

The spray-dried support was calcined at 1000° C. to produce a support in which 93 wt % of the titania was in the rutile phase as determined by X-ray diffraction (ASTM D 3720-78). The balance of the titania was in the anatase phase. The support had a surface area of 17 m²/g and a water pore volume of 0.33 cc/g.

(b) Cobalt and Rhenium Deposition

The catalyst precursors (dry impregnates) were prepared by spraying the titania support with a cobalt nitrate and perrhenic acid solution in a bench scale rotary tumbler and tumbled for ten minutes to ensure a well-mixed, free flowing impregnate. Two types of samples were prepared: (i) dry impregnates having 6.9% Co and 0.12% Re, hereinafter referred to as "Low Re Impregnates"; (ii) impregnates having 7.0% Co and 0.58% Re, hereinafter referred to as "High Re Impregnates". In the case of the Low Re Impregnates, the support was impregnated with a 15.8 wt % Co and 0.28 wt % Re solution followed by heating in air at 4° C./min to 121° C. to dry the impregnate. In the case of the High Re Impregnates, the support was impregnated with a 14.7 wt % Co and 1.2 wt % Re solution. After each impregnation, the impregnate was dried by heating in air at 4° C./min to 121° C.

2. Comparative Example 1

Figure 4A:
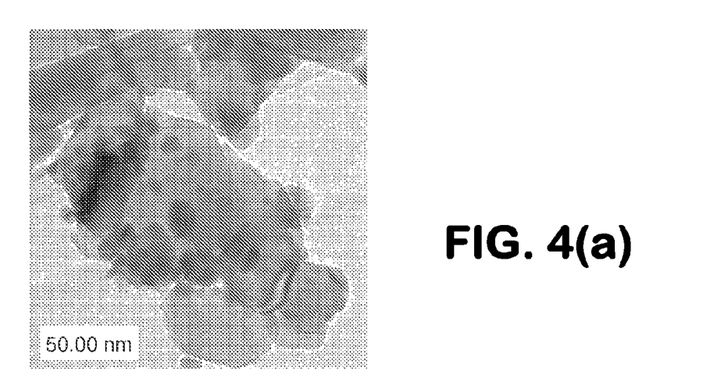
FIGS. 4a, 4b, 5a, 5b, 5c, 8a, 8b and 10a are microphotographs of titania-supported cobalt catalysts prepared by methods other than those of the present invention.
Figure 4B:
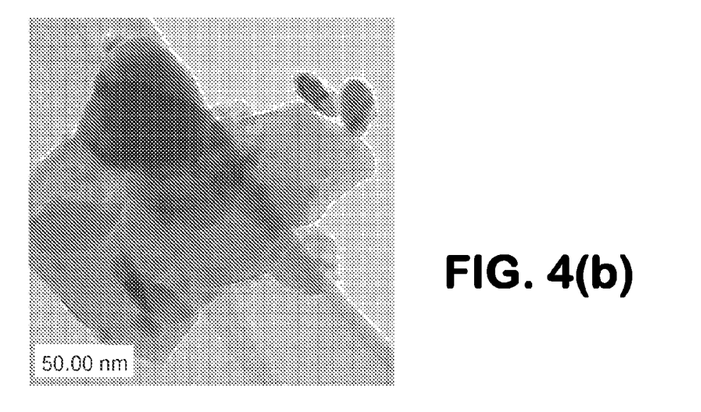
Figure 4C:
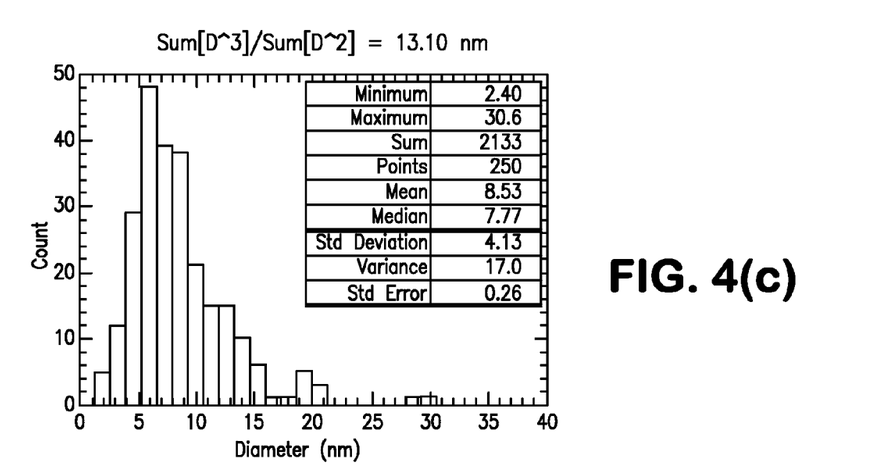
FIGS. 4c, 5d, 8c and 10b are TEM histograms of those catalysts.

A dried Low Re Impregnate was heated in air at 4° C./min. to 160° C. (to partially decompose the Co nitrate) and held at that temperature for 1 hour, followed by heating at 4° C./min. to 300° C. and holding for 1 hour at that temperature (to form cobalt oxide). This calcined material was reduced in 100% $H_2$ at 375° C. at atmospheric pressure for 90 minutes. After cooling to room temperature, the catalyst was passivated in 1% $O_2$ and then air dried to allow measurement by TEM. FIGS. 4a and 4b show Co crystallites of about 13 nm with variable nanoscale homogeneity. FIG. 4c is the TEM histogram of the analyzed material.

3. Comparative Example 2

Figure 5A:
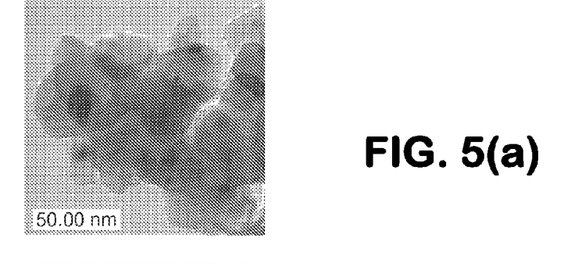
Figure 5B:
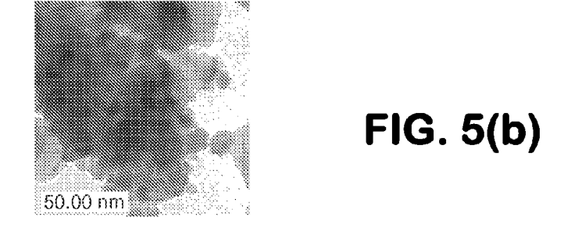
Figure 5C:
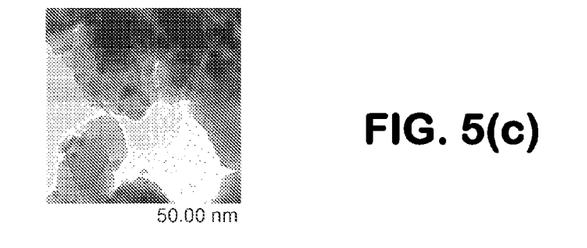
Figure 5D:
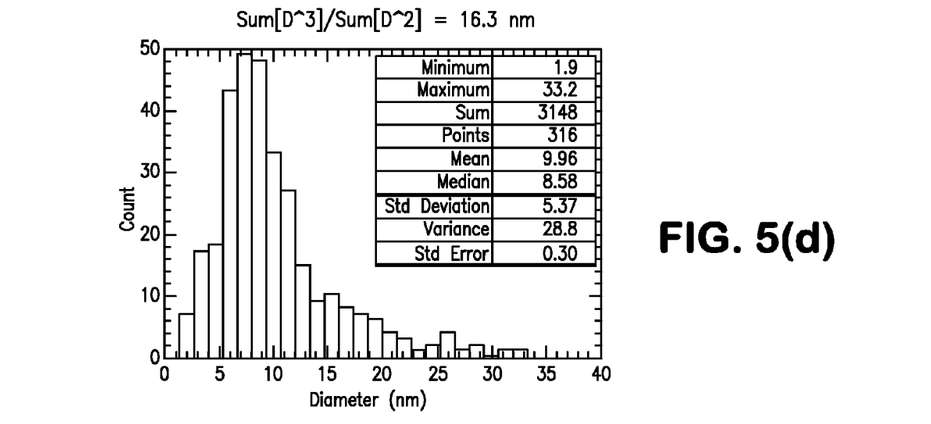

A dried Low Re Impregnate was heated in air at 4° C./min. to 160° C. (to partially decompose the Co nitrate) and held at that temperature for 1 hour. The so treated material was allowed to cool to room temperature in a dry, inert atmosphere and then reduced and passivated as described in Comparative Example 1. The results in comparative example 2 show that the crystallites are poorly distributed and large (>16 nm). FIGS. 5a, 5b and 5c show poorly distributed large (>16 nm) Co particles. The TEM histogram is given in FIG. 5d.

4. Examples 1 and 2

A dried Low Re Impregnate was heated in air at 4° C./min. to 160° C. (to partially decompose the Co nitrate) and held at that temperature for 1 hour. The so heated impregnate was cooled to room temperature and then exposed overnight to a high humidity atmosphere by placing it in a container along with an open beaker of water, thereby hydrolytically decomposing the intermediate.

Figure 6A:
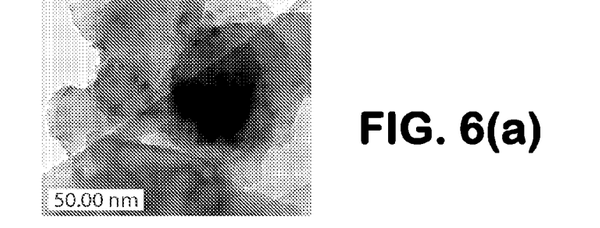
FIGS. 6a, 6b, 6c, 7a and 9a are microphotographs of titania-supported cobalt catalysts prepared according to the method of the invention.
Figure 6B:
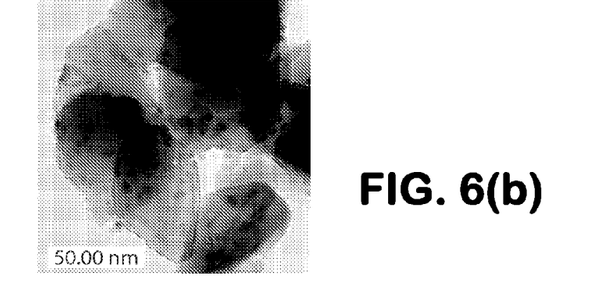
Figure 6C:
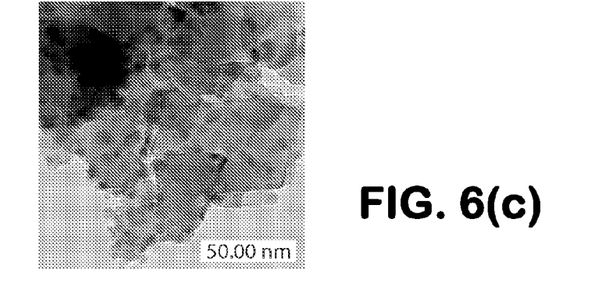
Figure 6D:
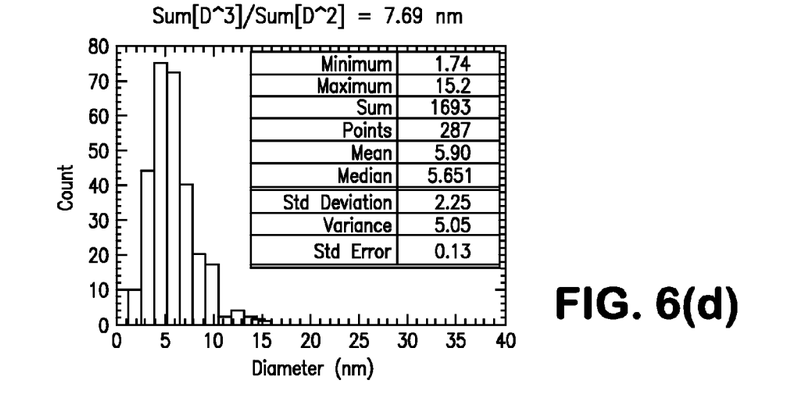
FIGS. 6d, 7b and 9b are TEM histograms of those catalysts.

For example 1, a sample of the hydrolytically decomposed intermediate was reduced in 100% $H_2$ at 375° C., passivated and subjected to TEM analysis. The results are shown in FIGS. 6a, b, c and d. As can be seen, the Co crystallites of the catalyst of this example 1 are well distributed and have a Dsv of 7.69 nm.

Figure 7A:
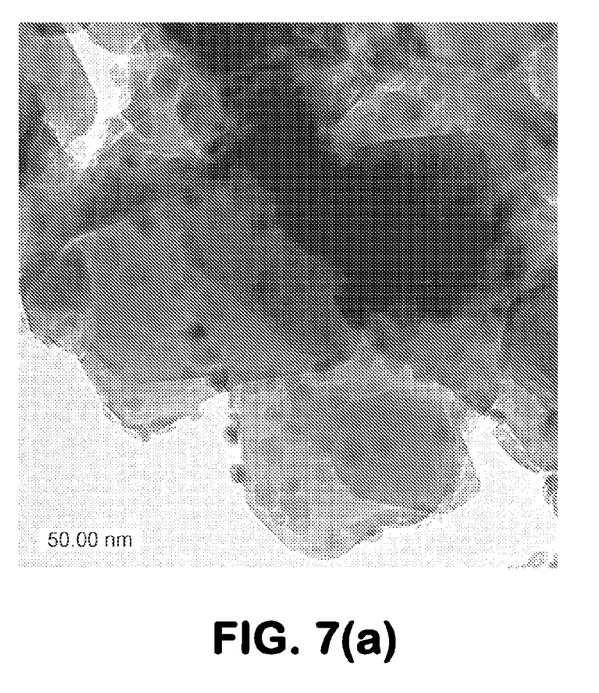
Figure 7B:
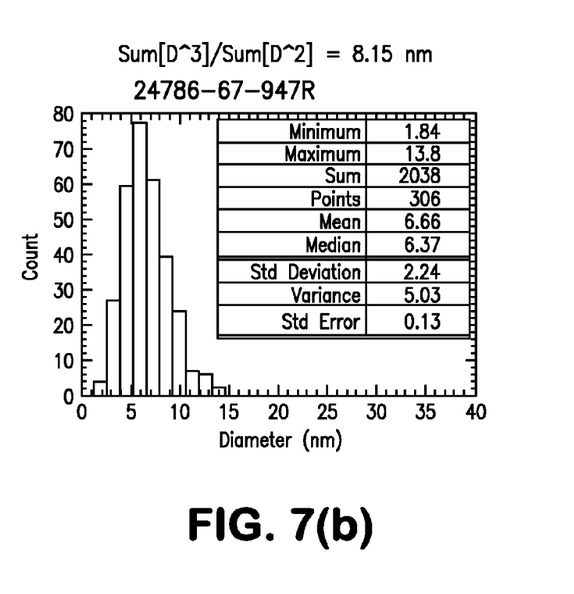

For example 2, another sample of the hydrolytically decomposed intermediate was heated in air at 4° C./min. to 121° C. and held at that temperature for 1 hour, then heated at 4° C./min. to 160° C. and held at that temperature for 1 hour, and finally heated at 4° C./min. to 300° C. and held at that temperature for 1 hour. This calcined sample was then reduced, passivated and subjected to TEM analysis as described for example 1. The results are shown in FIGS. 7a and 7b. As can be seen, the Co crystallites of the catalyst of this example 2 are well distributed and have a Dsv of 8.15 nm.

Comparative Example 3

Figure 8A:
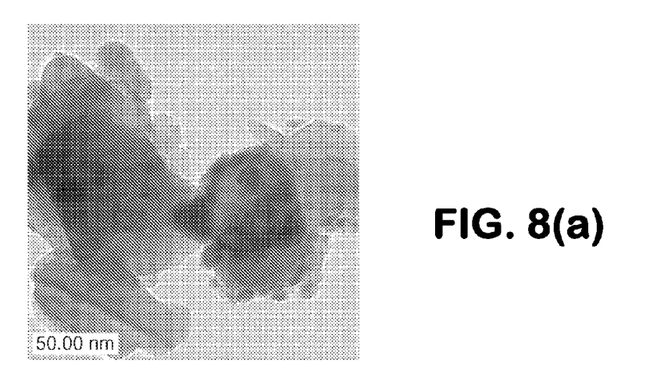
Figure 8B:
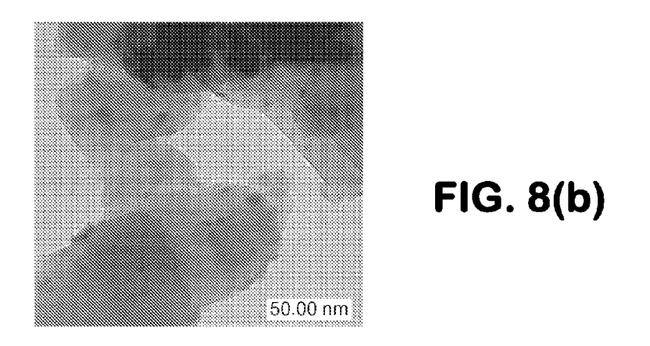
Figure 8C:
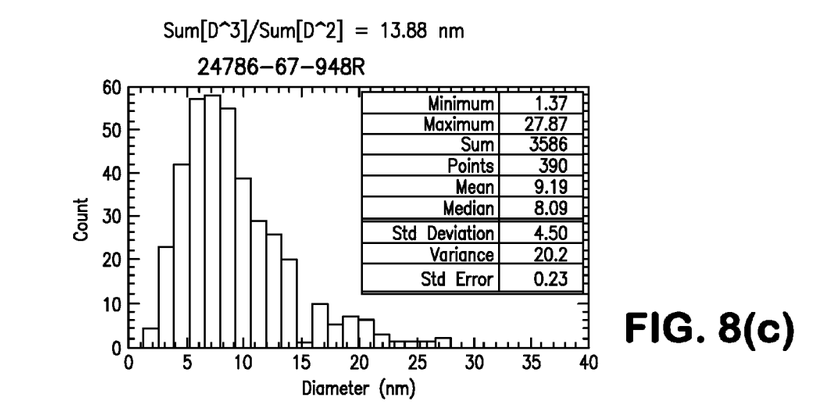

A dried Low Re Impregnate was reduced in 100% $H_2$ at 375° C., passivated and subjected to TEM analysis. The results are shown in FIGS. 8a, 8b and 8c. As can be seen, the Co crystallites of the catalyst of this comparative example 3 are not well distributed: there are two groups of particle sizes and the Dsv is of about 14 nm.

Example 3

Figure 9A:
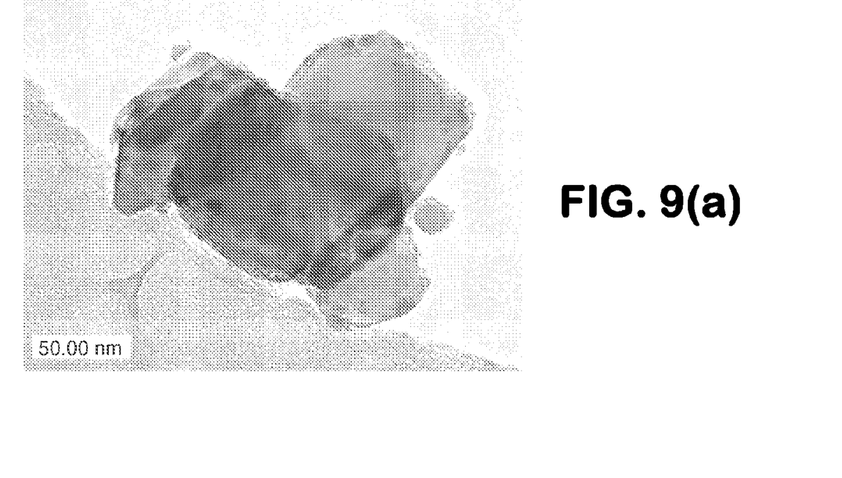
Figure 9B:
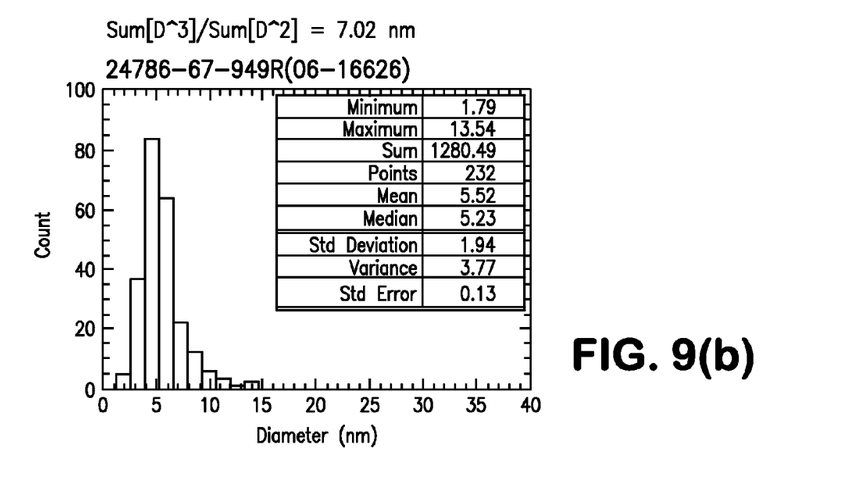

A dried High Re Impregnate was heated in air at 4° C./min. to 160° C. (to partially decompose the Co nitrate) and held at that temperature for 1 hour. The so heated impregnate was cooled to room temperature and then exposed overnight to a high humidity atmosphere by placing it in a container along with an open beaker of water, thereby forming a hydrated intermediate. The hydrated intermediate was then reduced in 100% $H_2$ at 375° C., passivated and subjected to TEM analysis. The results are shown in FIGS. 9a and 9b. As can be seen, the Co crystallites of the catalyst of this example 3 are well distributed and have a Dsv of 7.7 nm.

Comparative Example 4

Figure 10A:
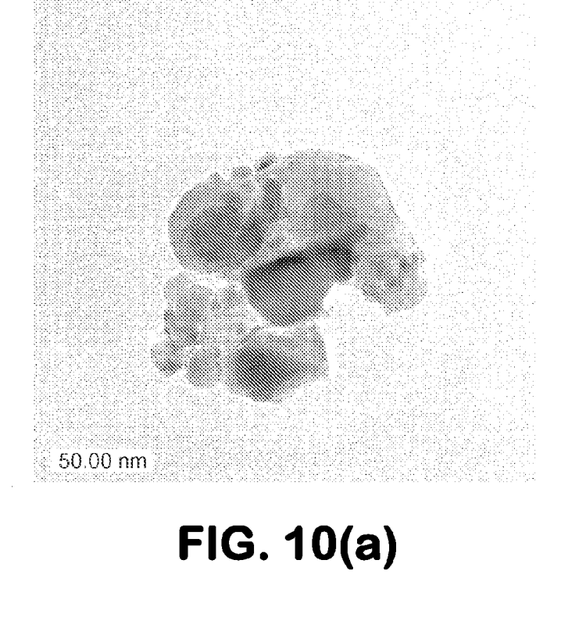
Figure 10B:
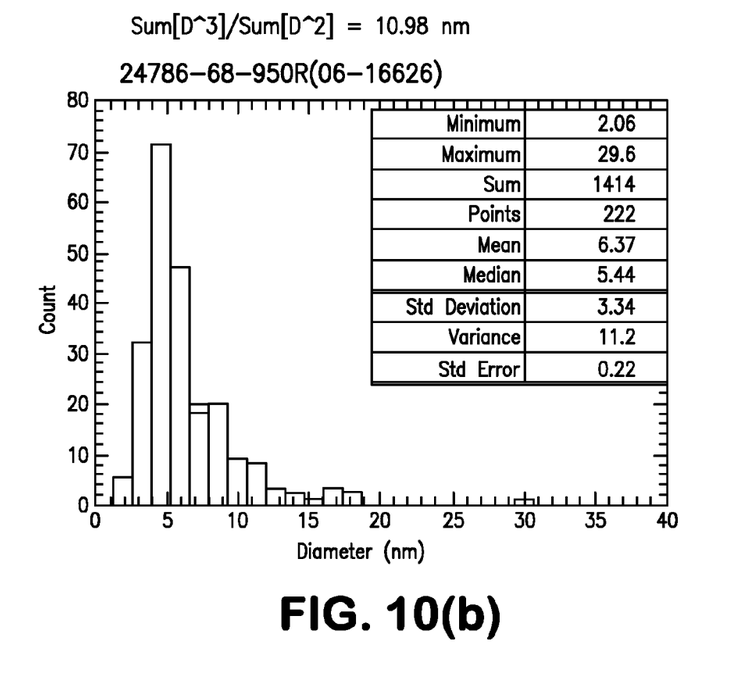

A dried High Re Impregnate was heated in air at 4° C./min. to 160° C. (to partially decompose the Co nitrate) and held at that temperature for 1 hour. The so heated impregnate was then reduced in 100% $H_2$ at 375° C., passivated and subjected to TEM analysis. The results are shown in FIGS. 10a and 10b. As can be seen, the Co crystallites of the catalyst of this comparative example 4 are to not well distributed and have a Dsv of about 11 nm.

What is claimed is:

1. A method for preparing a cobalt-containing catalyst, the method comprising:
   impregnating a catalyst support with an aqueous solution of cobalt nitrate;
   drying the cobalt-impregnated support;
   impregnating the support with rhenium as a promoter metal in an amount sufficient to provide a loading of rhenium in the range of about 0.01 wt % to about 0.2 wt %, based on the total weight of the catalyst; and
   conducting a two-step decomposition protocol consisting of the following steps:
      heating the dried support in an oxygen-containing atmosphere that is substantially free of water and is free of added NO, said heating being at a temperature and for a time sufficient to show infrared peaks developing at 1820 $cm^{-1}$ to 1877 $cm^{-1}$ and at a temperature at which only a first endotherm of nitrate decomposition occurs and for a time sufficient for the dried support to pass through only the first endotherm thereby providing an intermediate material, and
      subjecting the intermediate material to a step of hydrolytically decomposing the intermediate material;
   followed only by an optional calcining step and then by a reduction step, whereby a cobalt-containing catalyst is obtained.

2. The method of claim 1, further comprising the step of calcining the catalyst after hydrolytically decomposing the intermediate material and before reduction.

3. The method of claim 1, wherein the support is a titania support.

4. The method of claim 1, wherein the oxygen-containing atmosphere is dry air.

5. The method of claim 1, wherein the intermediate material is a nitrosyl species.

6. The method of claim 5, wherein the nitrosyl species is present following said heating but not following said calcining.

7. The method of claim 6, wherein the dried support is heated to about 160° C.

8. The method of claim 7, wherein the support is heated in a rotary calciner to about 160° C. and held at that temperature for about 2 to about 10 minutes.

9. The method of claim 1, including impregnating the support with rhenium before the impregnated support is heated to partially decompose the cobalt nitrate.

10. The method of claim 1, wherein the cobalt-containing catalyst has a surface volume particle size distribution, Dsv, of less than about 10 nm.

11. The method of claim 10, wherein Dsv is from about 6 nm to less than about 10 nm.

\* \* \* \* \*